C. GAHREN.

Take-Ups for Looms.

No. 5,706. Reissued Dec. 23, 1873.

Witnesses.
E. Wolff
Jacob Felbel

Inventor.
Charles Gahren
By attorney
F. N. McGuire

AM. PHOTO-LITHOGRAPHIC Co. N.Y. (OSBORNE'S PROCESS)

UNITED STATES PATENT OFFICE.

CHARLES GAHREN, OF NEW YORK, N. Y., ASSIGNOR TO MORITZ COHN, OF SAME PLACE.

IMPROVEMENT IN TAKE-UPS FOR LOOMS.

Specification forming part of Letters Patent No. 133,845, dated December 10, 1872; reissue No. 5,706, dated December 23, 1873; application filed October 21, 1873.

*To all whom it may concern:*

Be it known that I, CHARLES GAHREN, of the city, county, and State of New York, have invented a new and useful Improvement in Take-Ups for Looms; and I do hereby declare the following to be a full, clear, and exact description thereof, which will enable those skilled in the art to make and use the same, reference being had to the accompanying drawing forming part of this specification, in which drawing—

Figure 2:
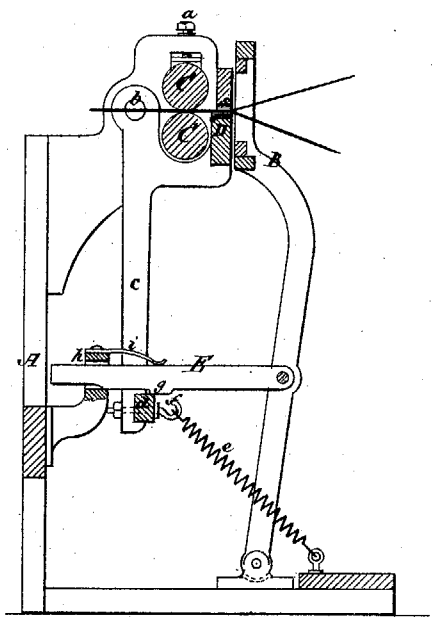
Figure 1:
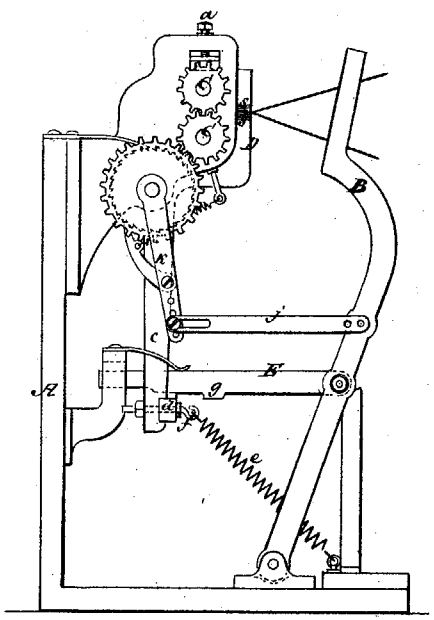

Figure 1 represents an end view of my invention. Fig. 2 is a longitudinal vertical section of the same in the plane *x x*, Fig. 3; and Fig. 3 is a plan or top view of the same.

Similar letters indicate corresponding parts.

This invention relates to a take-up mechanism of that class in which a retaining-clamp acts in connection with the take-up rollers of a loom; and consists in having the parts combined and operating together so that the clamp shall open at the moment the batten strikes up each time, and so that the rolls shall move in such a manner that if a weft-thread be thrown partially across the warp such portion only of the fabric as shall have received such partial weft-thread (and which is rendered slack by the blow of the batten) shall be taken up, the rolls slipping on the other portion and the clamp closing on the fabric as the action of the take-up rolls ceases, and preventing any portion of it from moving back, all as will be hereinafter more fully described.

In the accompanying drawing, A designates a portion of the frame of a loom, in which is mounted the batten B, in the usual manner. The woven fabric passes through between the take-up rollers C C, which extend the whole width of the frame A, and which are geared together, so that they revolve in opposite directions. Set-screws *a* serve to compress said rollers, so that they take hold of the fabric with the required tenacity. Between the take-up rollers and the batten is situated the clamp D, the movable jaw of which is attached to the frame A by pivots *b*, and from said movable jaw extend arms *c*, which are connected together by a cross-bar, *b*, and to which are hitched springs *e*, which have a tendency to keep the clamp firmly closed. These springs catch in hooks *f*, which are adjustable in the arms *c* of the movable jaw, so that the tension of the springs can be regulated. The jaws of the clamp are so lined or faced with flannel or some other suitable impressible substance, as seen at *s*, that they will take a firm hold on the woven material throughout its entire width. To the support of the batten B is hinged an arm, E, which is provided with a tappet, *g*, while its front end is cam-shaped, and moves in a slotted standard, *h*, secured to the frame A. A spring, *i*, which bears on the tappet-arm has a tendency to depress the same in the slot of said standard. When the batten moves forward, and just at the moment when it strikes up the weft, the tappet *g* comes in contact with the cross-bar *d* of the clamp, and the clamp is opened so as to release the fabric; but immediately thereafter the cam-shaped part of the tappet-arm enters the slot in the standard *h*, and thereby the tappet *g* is raised clear of the cross-bar *d*, and the clamp closes again, while from one of the supports of the batten also extends a rod, *j*, which connects with a lever-pawl, *k*, that serves to impart the requisite motion to the take-up rollers, (see Fig. 1,) the lever-pawl and the connecting-rod being so arranged that the amount of motion imparted to the take-up rollers can be adjusted; and these parts are so arranged and so operate together that the take-up rolls move while the clamp is open, and the clamp closes on the taken-up fabric as the motion of the take-up ceases, and before the batten recedes.

By this arrangement it will be seen the following operation is attained, viz: When a weft-thread is thrown in partially across the warp, the batten, in striking up, renders that portion of the fabric slack across which the partial weft-thread extends, and as the take-up rollers revolve at the moment when the batten strikes, and while the fabric is released from the clamp D, that portion only of the fabric which has been rendered slack by the blow of the batten is taken up, while the take-up rollers slip on the remaining portion of the fabric; and since the clamp closes immediately after the blow of the batten, the fabric, after having been taken up, is prevented from moving back, and is held firmly in position for the subsequent motion of the shuttle.

By these means I am enabled to weave successfully irregular pieces of work, such, for instance, as corsets, where a number of partial weft-threads have to be thrown into the warp.

The great importance and advantage of having the faces of the jaws covered with a packing of some suitably impressible or yielding substance will be understood when it is remembered that, in weaving such articles, for instance, as corsets, the gussets and double pocket portions lie obliquely to the jaws of the clamp, so that the latter have to act on various thicknesses of material at different points in the width of the fabric, and that they could not successfully gripe and hold the fabric against all chance of slipping were their faces not thus, or by some means, enabled to gripe and hold the varying thicknesses of stuff.

In carrying out my invention, I do not propose to restrict myself to any particular construction of take-up rollers; neither do I wish to be understood as laying claim, broadly, to the use of clamping-jaws in a loom provided with take-up rolls, as this has been done before.

What I claim as new, and desire to secure by Letters Patent, is—

1. In combination with the batten, the clamping-jaws and a take-up mechanism, the whole arranged to operate together in substantially the manner described, for the purpose set forth.

2. The jaws of the clamp for holding the woven fabric, when provided with an impressible or yielding facing or facings, substantially as and for the purposes described.

In testimony whereof I have hereunto set my hand and seal this 4th day of October, 1873.

CHARLES GAHREN. [L. S.]

In presence of—
JAMES HARRIS,
ORLANDO P. SMITH.